Feb. 20, 1945.    R. E. MEADE ET AL    2,369,680
PROCESS FOR MANUFACTURING A VITAMIN CONCENTRATE
Filed April 17, 1942
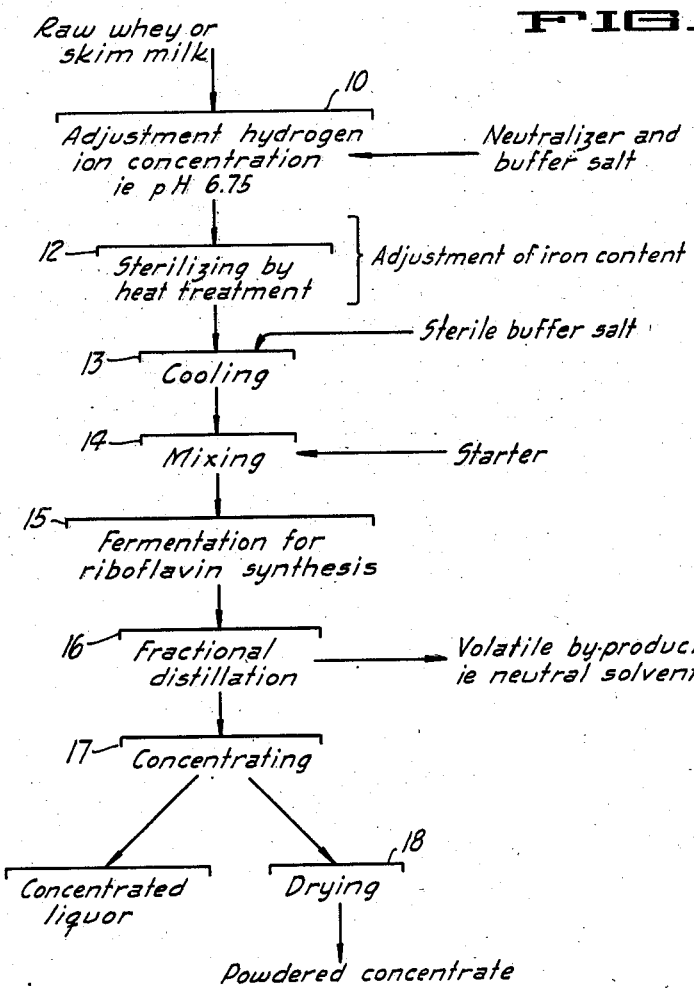
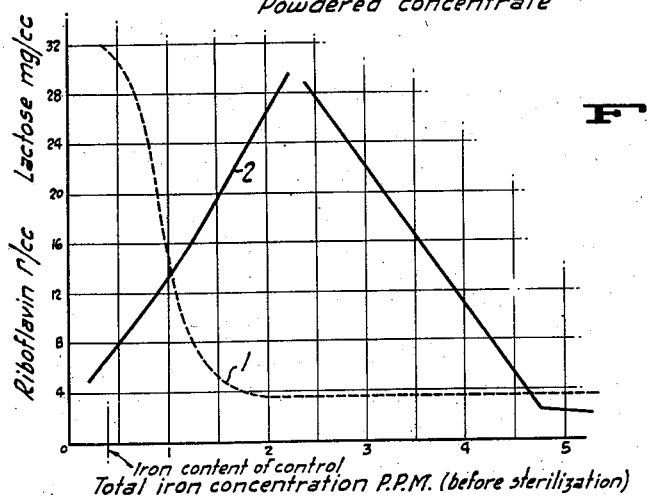
INVENTORS
REGINALD E. MEADE
HENRY L. POLLARD
NELSON RODGERS
BY
ATTORNEY Patented Feb. 20, 1945

2,369,680

UNITED STATES PATENT OFFICE 2,369,680

PROCESS FOR MANUFACTURING A VITAMIN CONCENTRATE

Reginald E. Meade and Henry L. Pollard, Appleton, and Nelson E. Rodgers, Madison, Wis., assignors to Western Condensing Company, San Francisco, Calif., a corporation of California Application April 17, 1942, Serial No. 439,310

5 Claims. (Cl. 195—42)

This invention relates principally to processes for the manufacture of products rich in vitamin factors, particularly riboflavin, and to products resulting from such processes, and to by-products such as neutral solvents produced in such processes.

It is an object of the invention to provide a novel process for manufacturing vitamin concentrates of the above character, by syntheses resulting from bacteriological fermentation. The present invention is characterized by fermentation of a lactose-containing lacteal material, particularly raw liquid whey or skim milk.

Another object of the invention is to provide a process of the above character which will result in relatively high yields of riboflavin, with commercially available supplies of liquid whey and skim milk.

Another object of the invention is to provide a process which will successfully utilize the carbohydrate in whey in production of neutral solvents such as ethyl alcohol, acetone and butyl alcohol.

A further object of the invention provides a process which results in relatively high yields of both riboflavin and neutral solvents such as ethyl alcohol, acetone and butyl alcohol.

Additional objects and characteristics of the invention will appear from the following description in which the preferred embodiment has been set forth in conjunction with the flow sheet of the attached drawing.

The present invention involves the controlled fermenting of whey or skim milk, with a bacterium capable of synthesizing riboflavin. Whey and skim milk are known to contain water soluble vitamin B complexes, including riboflavin, in addition to nutritive food substances such as lactose and casein. They synthesis of riboflavin in such a material makes it possible to directly form a product which can be added to food stuffs for human or animal consumption. We have found that the bacterium *Clostridium acetobutylicum* is capable under certain controlled conditions of synthesizing substantial amounts of riboflavin in whey or skim milk. As a by-product of fermentation by the use of such bacteria, certain neutral solvents such as ethyl alcohol, acetone and butanol are produced, and which can be recovered as valuable by-products.

We have found that liquid whey and skim milk as normally produced by various commercial processes, do not furnish a suitable medium for the growth of *Clostridium acetobutylicum* for the production of riboflavin and neutral solvents such as this type of bacterium is capable of producing in other media. We have found that the fermentation of whey or skim milk as described above is critical with respect to the presence of iron. We have also found that liquid whey and skim milk, produced by commercial or laboratory methods, under conditions which permit no addition of salts of iron as by contamination with pipes, tanks, etc., do not contain sufficient iron to result in a (normal, thorough, vigorous) relatively complete fermentation in a comparatively short period of incubation. We have further discovered that by the addition of small amounts of the salts of iron under controlled conditions, the whey or skim milk medium, when inoculated and incubated according to the process disclosed herein, comprises a highly suitable medium for fermentation by the bacterium *Clostridium acetobutylicum* and results in a relatively vigorous and complete fermentation in a comparatively short period of incubation. Thus we have found that as the iron content in whey or skim milk is increased above that of whey or skim milk to which no iron has been added (and which as shown by the subsequent analysis contains about 0.37 part per million of iron) the relative vigor and completeness of the fermentation is increased up to a point beyond which further addition of iron has little apparent effect. We have further discovered that synthesis of riboflavin by fermentation of whey or skim milk as described above is critical with respect to the presence of salts of iron. Thus if the iron content is below the amount necessary to result in a relatively complete fermentation, relatively little riboflavin is synthesized. However, as the relative completeness of the fermentation is increased, due to the addition of iron, the effective synthesis of riboflavin is increased up to the range at which further addition of iron does not appear to stimulate fermentation to any marked degree. A further discovery discloses that addition of iron beyond the range which results in a relatively complete fermentation, results in a marked reduction in riboflavin synthesis.

Thus we have found that when an iron content is present and is maintained between the limits of from about one to three parts per million in the batch of material being fermented, riboflavin is effectively synthesized to more than six times the original riboflavin content of the whey or skim milk medium, whereas if the iron content is substantially above or below this range, considerably less riboflavin is synthesized.

In the treatment of the whey or skim milk preparatory to inoculating a batch of material with a starter, we prefer to completely or substantially completely sterilize the material by heat treatment, and in addition acidity is neutralized and a buffer salt like calcium carbonate may be provided. The buffer salt tends to prevent development of too much acidity during fermentation.

One particular procedure which can be followed is shown in the attached flow sheet. In this instance commercial raw whey or skim milk is treated at 10 if necessary to adjust its hydrogen ion concentration to about pH 6 to 7 in order to encourage rapid development of the fermentation. Since commercial raw whey and skim milk are usually acid, this adjustment is carried out by introduction of suitable amounts of a neutralizer like sodium, potassium or calcium hydroxide. In addition, a suitable buffer salt like calcium carbonate is preferably added. In a typical instance where 1,000 pounds of raw whey is being treated, 1.0 to 3.0 pounds of calcium carbonate can be added after the pH has been adjusted. If the buffer salt is made sterile, all or a part of it can be added after sterilization and before fermentation, as for example during cooling 13.

The material is then subjected to sterilizing treatment 12 which can be carried out for example by heating the material to a temperature of the order of 250° F. for a period of time such as from 15 to 20 minutes. Following this heat treatment the material is subjected to cooling 13, as by flashing the material into a vacuum chamber. The cooled material at a temperature of about 100° F. is then intermixed at 14 with a starter, preparatory to the fermenting operation 15. This can be carried out by introducing the material into a suitable fermenting container into which the starter is introduced. The starter can be prepared as follows: A suitable strain of *Clostridium acetobutylicum*, such as described by McCoy, E., Fred, E. B., Peterson, W. H., Hastings, E. G. (A cultural study of the acetone butyl alcohol organism, Journal of Infectious Diseases, 39: 457, 1926) is taken from soil stock and heat shocked in a sterile medium such as liver extract, and then is allowed to propagate. This material is ten added to a batch of sterile whey, and after permitting fermentation and bacterial growth, this material is used to inoculate a larger batch of sterile whey. Successive transfers can be made in this fashion until sufficient material is prepared for inoculating the main batch of material. In a typical instance 30 to 80 pounds of starter prepared in this fashion can be used for a main batch of about 1,000 pounds of whey.

Fermentation is carried out when the material has an iron concentration between certain limits, as will be presently described, and preferably a temperature of about 100° F. under conditions such as will prevent introduction of contaminating organisms. Variation in temperature as much as 5 degrees above or below 100° F. appears to impair development of the fermentation, although some development can take place beyond such temperature limits. Also it is preferable that the tank employed for fermentation be constructed of non-iron-containing materials or lined with materials such as glass, stainless steel, or other materials which will not cause such contamination with iron as to bring the iron content beyond the limits desired. In general, fermentation can continue from 12 to 48 hours, or until there is no noticeable further increase in riboflavin content.

As an aid to fermentation, it is preferable, but not essential, to provide small amounts of nitritive mineral salts such as salts of strontium, tin, manganese, lithium and zinc. For example, we can use manganese sulfate, lithium chloride, strontium chloride, tin chloride and zinc chloride to form a solution molar to 0.00003 with respect to each salt.

During fermentation certain by-products are formed, particularly neutral solvents such as ethyl alcohol, acetone and butanol, together with gases such as hydrogen and carbon dioxide. The gases can be vented from the fermenting tank as formed. The solvents can be removed at 16 by fractional distillation, and after removing volatile products the material can be concentrated at 17 by evaporation to produce a concentrated liquor. If desired this liquor can be further subjected to drying 18 to produce a powdered product. In place of separate fractional distillation at 16, the solvents can be condensed from the vapors evolved during concentration by evaporation, or such vapors can be condensed to form a water-solvent mixture from which the solvents can be removed by fractional distillation.

At some point after fermentation it is desirable to inhibit further bacterial action, as for example by heat sterilization applied as a separate step or in conjunction with concentrating by evaporation.

As previously stated, we utilize the presence of small amounts of iron, during the fermenting action 15, in order to properly stimulate fermentation and consequently synthesize riboflavin. Adjustment of the iron salts present can be made depending upon the iron present in the initial raw material. According to our observations shown by the subsequent analysis whey produced from skim milk in the laboratory by rennet coagulation contains about 0.37 part per million of iron. However, commercial whey, by contamination with iron pipes, vessels, etc., usually contains in excess of this amount and may contain as high as 10 or 12 parts per million of iron when allowed to contact iron and possessing a low pH such as below pH of 6.0. Should the amount of iron present be below the range desired in the fermenting operation, then an additional amount of a suitable iron salt is added, as for example a soluble salt like iron sulfate. To such whey one can add sufficient iron to increase the total iron to between 1.0 to 1.5 parts per million of iron in the form of iron sulfate to secure results, provided the addition is made after sterilization, and about 1.5 to 2 parts per million if added before sterilization. When added before sterilization, a part of the iron is rendered ineffective and is apparently not completely available during fermentation.

In the event the initial raw material contains too high a percentage of iron, which may result from storage in iron tanks, then suitable methods must be used for reducing the amount present during the fermenting operation 15. This can be accomplished by removal of the metal salts, or by diluting the raw material with either water or additional raw material which contains no iron, or which is relatively low in iron content. According to our observation, the optimum amount of effective iron present in solution during the fermenting operation is in the neighborhood of 1.25 parts per million.

The product obtained by the above procedure is a concentrate which can be further refined or mixed or blended with various food materials for human or animal consumption. By use of the process and with from four to five transfers in preparing the starter, the riboflavin content of whey has been increased from about 1.4 to from 6 to 50 gammas per cc. (before concentration by evaporation) which corresponds to about 240 to 2200 gammas per gm. on a dried basis. Some of the lactose is consumed in the fermenting process so that the final product contains a reduced amount of milk sugar, depending upon the extent of fermentation. The solids of the final product are the remaining solids of the whey or skim milk employed and therefore are available food ingredients which are used to advantage when the product is blended with other materials such as various milk products, bread and bakery products, poultry and animal feeds, and the like.

As an example of the results which can be secured (although riboflavin synthesis in excess of results shown can be obtained by our procedure) the following typical analyses can be given for whey before and after carrying out the present process within limits of iron content between 1.5 and 2.0 parts per million of total iron prior to sterilization:

Whey supplied to the process

|  | Liquid | 3% moisture |
|---|---|---|
|  | Per cent | Per cent |
| Sugar (as lactose) | 4.70 | 70.40 |
| Protein | 0.90 | 13.40 |
| Ash | 0.65 | 9.70 |
| Acid (as lactic acid) | 0.25 | 3.50 |
| Total solids | 6.50 | 97.00 |
|  | Micrograms per cc. | Micrograms per gm. |
| Riboflavin | 1.7 | 25.5 |
| Per cent increase in riboflavin due to synthesis | 0 | 0 |

Whey products produced by fermentation process

[Total iron prior to sterilization 1.5 to 2.0 parts per million]

|  | Liquid residue (after fermentation) | 3% moisture basis |
|---|---|---|
|  | Per cent | Per cent |
| Sugar (as lactose) | 0.71 | 28.6 |
| Protein | 0.74 | 29.4 |
| Ash | 0.70 | 28.0 |
| Acid (as lactic acid) | 0.28 | 11.0 |
| Total solids | 2.43 | 97.0 |
|  | Micrograms per cc. | Micrograms per gm. |
| Riboflavin | 20 to 30 | 800 to 1,200 |
| Per cent increase in riboflavin due to synthesis | 1,076 to 1,664 |  |

As an example of results obtained when iron concentrations are not maintained within the optimum range disclosed herein, the following analyses of product resulting from fermentation are given:

Product resulting from fermentation with iron below optimum

[Original iron content of whey as received, .37 part per million]

|  | Liquid residue | 3% moisture basis |
|---|---|---|
|  | Per cent | Per cent |
| Sugar (as lactose) | 3.20 | 63.0 |
| Protein | 0.80 | 16.0 |
| Ash | 0.65 | 13.0 |
| Acid (as lactic acid) | 0.25 | 5.0 |
| Total solids | 4.90 | 97.0 |
|  | Micrograms per cc. | Micrograms per gm. |
| Riboflavin | 6.0 | 120 |
| Per cent increase in riboflavin due to synthesis | 253 |  |

It is observed by a comparison of the above analyses with the analysis shown for a fermentation containing the optimum quantity of iron, that sub-optimum amounts of iron result in an incomplete fermentation in a commercially practical period of incubation such as 48 hours as compared to a relatively complete fermentation when the iron content is above the sub-optimum level. Observation and tests made during the period of incubation indicate that the activity of the bacteria is substantially retarded when the total amount of iron present in the whey media before sterilization is below 1.5 parts per million.

Fig. 2 shows curves 1 and 2 plotted to show the effect of varying the amounts of iron added to a whey. The whey in this instance was prepared as follows: Raw skim milk was heated to 100° F. and precipitated with rennet. The resulting whey was separated from the coagulated casein precipitate and was segregated into samples of 300 cc. each. Iron sulfate was added to these samples to produce samples ranging from zero to 5.5 parts per million of added iron. 0.3% of calcium carbonate was also added to each sample, and each sample was sterilized by heating. Each sample was then inoculated with the fermenting starter, and fermentation was continued for a 48 hour period. The samples were then analyzed for lactose and riboflavin contents. Curve 1 shows the effect of added iron upon lactose content while curve 2 shows the effect of various amounts of added iron on the synthesis of riboflavin. As shown by Fig. 2 increased riboflavin yields are obtained when the iron content is between the range of 0.5 to less than 4.5 parts per million while the maximum riboflavin production occurs in a whey media when the iron content is sufficient to result in a relatively complete fermentation resulting in a substantial reduction of lactose in 48 hours.

Further observations indicate that amounts of iron in excess of the optimum amount necessary to produce a vigorous fermentation, result in a substantial decrease in synthesis of riboflavin but vigor of fermentation is not impaired by such excess amounts of iron. This is clearly indicated in Fig. 2 by the fact that when iron is added to the whey media before sterilization in amount to total 5.0 to 5.5 parts per million, the fermentation utilizes a substantial portion of the lactose but produces only a small quantity of riboflavin. As an example of the latter the following typical analyses are given for liquid and dry residue resulting from a typical fermentation in which the total iron content before sterilization was 5.0 parts per million.

Product resulting from fermentation with iron above optimum

[Total iron content before sterilization, 5.0 parts per million]

|  | Liquid residue | 3% moisture basis |
|---|---|---|
| Sugar (as lactose) | 0.53 | 24.0 |
| Protein | 0.74 | 33.0 |
| Ash | 0.65 | 29.0 |
| Acid (as lactic) | 0.25 | 11.0 |
| Total solids | 2.17 | 97.0 |
|  | Micrograms per cc. | Micrograms per gm. |
| Riboflavin | 1.8 | ¹ 77 |
| Per cent increase in riboflavin due to synthesis | 6 |  |

¹ This increase due mainly to removal of lactose.

The addition of iron above the amount necessary to product a vigorous fermentation results in a relatively complete utilization of the available lactose, thus producing a normal proportion of neutral solvents such as ethyl alcohol, acetone and butyl alcohol, although inhibiting riboflavin synthesis.

In the foregoing particular reference has been made to synthesis of riboflavin. It is to be understood, however, that other nutritive or vitamin factors or factors of vitamin B complex may be synthesized in addition to riboflavin.

We claim:

1. In a process for manufacturing a vitamin concentrate, the steps of synthesizing riboflavin by fermenting a sterile, lactose-containing lacteal material, the fermentation being carried out by inoculation of the material with *Clostridium acetobutylicum* and in the presence of a salt of iron, the concentration of the iron being between the range of 1 to 3 parts per million.

2. In a process for manufacturing a vitamin concentrate, the steps of synthesizing riboflavin by fermenting a sterile lactose-containing lacteal material, the fermentation being carried out by inoculation of the material with *Clostridium acetobutylicum* and in the presence of a salt of iron, the concentration of the iron being between the range of 1 to 3 parts per million, the material undergoing fermentation being retained at a temperature of about 100° F.

3. In a process for manufacturing a vitamin concentrate, the steps of synthesizing riboflavin by fermenting a sterile lactose containing lacteal material, the fermentation being carried out by inoculation of the material with *Clostridium acetobutylicum* and in the presence of iron, the concentration of the iron being between the range of from 0.5 to less than 4.5 parts per million.

4. In a process for manufacturing a vitamin concentrate, the steps of synthesizing riboflavin by fermenting a sterile lactose containing lacteal material having an initial riboflavin content, the fermentation being carried out by inoculation of the material with *Clostridium acetobutylicum* and in the presence of a salt of iron, the concentration of the iron being between the range of 0.5 to less than 4.5 parts per million, the fermentation being continued until the riboflavin content of the resulting material is increased to more than 3 times the initial riboflavin content.

5. In a process for manufacturing a vitamin concentrate, the steps of providing raw liquid whey having an iron content of about from 1.5 to 2 parts per million, heat sterilizing the material, inoculating the material with *Clostridium acetobutylicum*, and continuing fermentation to increase the riboflavin content to more than 3 times the riboflavin content of the raw whey.

REGINALD E. MEADE.
HENRY L. POLLARD.
NELSON E. RODGERS.